No. 699,926. Patented May 13, 1902.
E. S. MORRIS.
NUT LOCK.
(Application filed Jan. 6, 1902.)
(No Model.)
Fig. I.
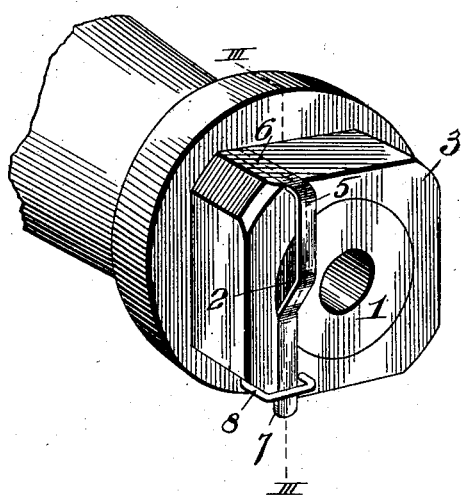
Fig. II.
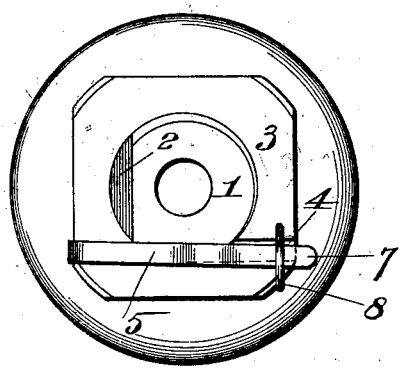
Fig. III.
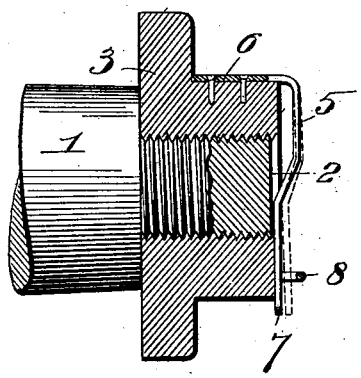
Attest:
W. P. Smith
E. Knight
Inventor:
E. S. Morris:
By Wright Bro
atty's

UNITED STATES PATENT OFFICE.

EMANUEL S. MORRIS, OF ST. LOUIS, MISSOURI.

NUT-LOCK.

SPECIFICATION forming part of Letters Patent No. 699,926, dated May 13, 1902.

Application filed January 6, 1902. Serial No. 88,669. (No model.)

*To all whom it may concern:*

Be it known that I, EMANUEL S. MORRIS, a citizen of the United States, residing in the city of St. Louis, in the State of Missouri, have invented certain new and useful Improvements in Nut-Locks, of which the following is a full, clear, and exact description, reference being had to the accompanying drawings, forming part of this specification.

My invention relates to a nut-lock particularly intended for use on vehicle-axles, the construction embodying a spring-tongue carried by the nut and adapted to engage a notch contained by the axle at its end whereby the nut is retained from rotation on the threaded portion of the axle-spindle.

My invention consists in features of novelty hereinafter fully described, and pointed out in the claim.

Figure I is a perspective view of the end of the axle-spindle and a nut equipped with my improved lock applied thereto. Fig. II is an end view of a nut equipped with my lock. Fig. III is a sectional view taken on line III III, Fig. I.

1 designates an axle-spindle, provided at its end with a notch 2, that extends inwardly from the perimeter of the spindle.

3 designates a nut provided with a groove 4, extending across the outer face thereof, as seen most clearly in Fig. II.

5 is a spring-tongue fixed to the nut 3 at 6 at the side thereof farthest removed from the groove 4, into which the free end 7 of the spring-tongue is adapted to enter. The spring-tongue is preferably extended at its rear portion slightly beyond the face of the nut, as seen in Fig. III, in order that the free forward end of the tongue will readily move into the groove 4.

8 is a guard fixed to the nut 3 and arranged to inclose the free end 7 of the spring-tongue, the guard being of sufficient dimensions to permit a limited sidewise movement of the free end of the spring-tongue in order that the tongue may be swung slightly to one side, as shown in Fig. II, to rest against the face of the nut and be maintained out of the groove 4 in the act of removing the nut from the spindle.

In applying the nut the free end 7 of the spring-tongue is seated in the groove 4, in which it is retained by its spring action. When the nut has been turned onto the threaded end of the spindle to the limit of its movement, the free end of the spring-tongue enters the notch 2 in the axle-spindle by springing thereinto from the end face of the spindle and by reason of its engagement also in the groove 4 of the notch serves to hold the nut effectually from turning.

I claim as my invention—

The combination with a notched threaded member, of a nut provided with a groove in the face thereof, a tongue constructed of spring material, carried by said nut and adapted to enter said groove to engage the notch in said threaded member, and a guard carried by said nut arranged to inclose the free end of said tongue, substantially as described.

EMANUEL S. MORRIS.

In presence of—
E. S. KNIGHT,
M. P. SMITH.